UNITED STATES PATENT OFFICE.

CARL KOCHMANN AND JULIUS KAUFMANN, OF BERLIN, GERMANY.

PROCESS FOR RENDERING MATERIALS OR ARTICLES RESISTANT TO WATER AND CHEMICALS.

No. 813,218.            Specification of Letters Patent.            Patented Feb. 20, 1906.

Application filed September 7, 1905. Serial No. 277,472.

*To all whom it may concern:*

Be it known that we, CARL KOCHMANN and JULIUS KAUFMANN, subjects of the German Emperor, residing at Berlin, in the Empire of Germany, have invented certain new and useful Improvements in Processes for Rendering Materials or Articles Resistant to Water and Chemicals, of which the following is a specification.

The subject of the present invention is a method of treating materials or articles with a compound or substance which at ordinary temperatures is capable of resisting water and most chemical influences—as, for instance, acids, acid vapors, alkalies, ether, benzin, fats, petroleum, &c. This substance, moreover, possesses the property of, in a melted state, completely penetrating porous and permeable materials and articles of any kind without influencing their appearance and their form and of thereby (after the cooling and hardening of the impregnation) rendering these materials or articles likewise capable of resisting water and chemical influences. Under this invention carnauba-wax is heated to a little above melting-point and alum in a suitably-powdered state is added to the melted mass while stirring same. The alum is dissolved to a fairly considerable extent in the melted carnauba-wax. The quantity of alum to be added may vary between five per cent. and the quantity required for complete saturation. The solution may be effected with or without the action of pressure. The mass so obtained may be cast and molded into any desired shape. It may be used with or without the addition of any desired filler substance as a waterproof and chemical-proof cement. If material, paper, cardboard, textile fabrics, or plaited work of any kind or shape are dipped into the melted substance, the latter permeates the materials after the manner of an impregnation, and after cooling and hardening the materials or objects are resistant to water and chemicals without having undergone any material change of appearance or form. It is essential or most desirable that this impregnation does not leave any externally-noticeable traces of the impregnating substance on the materials or objects treated, but that the articles are ready for immediate use without any scraping and finishing. Nevertheless, the impregnated articles may, for obtaining special effects, be subjected to known finishing, rolling, and smoothing processes.

The penetration into the materials is mainly attributable to the action of the alum, as without the addition of alum the melted wax never, even during drying and heating, completely permeates the materials, and above all a crust always forms on the surface, whereas in connection with this invention the impregnating mass is drawn into the interior of the materials without protruding on the surface.

To the melted mass fillers and dyestuffs of any kind may be added before the treatment for the purpose of increasing the hardness and firmness of the impregnated articles and for attaining special effects, and in this connection it has been found that the greater the percentage of added alum the higher the receptivity of the melted substance for foreign substances. If, for instance, an impregnating substance for a strong cotton or hemp textile fabric be saturated with a solution of three hundred grams of calcined alum in one kilogram of carnauba-wax, while adding three hundred grams of plaster-of-paris and three hundred grams of ground silicious earth ("kieselguhr") there is obtained after cooling a hard rather elastic and firm material which very closely approaches vulcanite. To obtain a very flexible, soft, and yielding impregnation for materials or the like, a drying-oil is added to the melted mass. The residue of ethereal oil of amber also gives good effects. Thus, for instance, a mixture of ten parts of carnauba-wax with one part of residue of oil of amber and one part of powdered alum supplies a suitable impregnation for materials that are to possess great flexibility and firmness. By varying the quantity of the alum added and of the oil or of the filler substances the most varied effects and grades of flexibility and elasticity and firmness of the impregnated materials may be produced, so that they may serve as substitutes for india-rubber, leather, oil-cloth, parchment, &c.

This invention is especially serviceable for the production of substitutes for materials now used in tires of carriages having pneumatic tubes, waterproof wearing-apparel, such as cloaks and hats, &c., and firm horn-like slabs.

Instead of adding alum and the other ingredients to melted carnauba-wax the materials or articles to be impregnated may be first treated with a concentrated solution of alum or the admixtures referred to and then saturated with the melted wax.

What is claimed is—

1. The process of rendering materials or articles resistant to water and chemicals, which consists in treating the materials or articles with a solution of alum, and melted carnauba-wax.

2. The process of rendering materials or articles resistant to water and chemicals, which consists in first saturating the material or article with a solution of alum, and then subsequently treating same with melted carnauba-wax; substantially as set forth.

In testimony whereof we have signed our names to this specification in the presence of two subscribing witnesses.

CARL KOCHMANN.
JULIUS KAUFMANN.

Witnesses:
ALBERT GRÜNFELD,
ARTHUR WÖLK.